United States Patent
Piekny et al.

(10) Patent No.: US 10,635,290 B2
(45) Date of Patent: Apr. 28, 2020

(54) VIRTUAL JOY STICK CONTROLS FOR ADJUSTABLE COMPONENTS IN VEHICLES

(71) Applicant: Karma Automotive, LLC, Costa Mesa, CA (US)

(72) Inventors: Mark G. Piekny, Newport Beach, CA (US); Bennett Leeds, Los Gatos, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 366 days.

(21) Appl. No.: 15/169,548

(22) Filed: May 31, 2016

(65) Prior Publication Data

US 2016/0364111 A1 Dec. 15, 2016

Related U.S. Application Data

(60) Provisional application No. 62/174,457, filed on Jun. 11, 2015.

(51) Int. Cl.
| | |
|---|---|
| *G06F 3/0488* | (2013.01) |
| *G06F 3/0486* | (2013.01) |
| *G06F 3/0484* | (2013.01) |
| *B60K 35/00* | (2006.01) |
| *B60R 1/02* | (2006.01) |
| *B60K 37/04* | (2006.01) |
| *B60Q 3/82* | (2017.01) |

(52) U.S. Cl.
CPC .......... *G06F 3/0488* (2013.01); *B60K 35/00* (2013.01); *B60K 37/04* (2013.01); *B60R 1/02* (2013.01);

(Continued)

(58) Field of Classification Search
CPC .. G06F 3/0488; G06F 3/04847; G06F 3/0486; G06F 3/04842; B60K 2350/1028;
(Continued)

(56) References Cited

U.S. PATENT DOCUMENTS

| | | | | |
|---|---|---|---|---|
| 2002/0003571 | A1* | 1/2002 | Schofield | ............... B60C 23/00 |
| | | | | 348/148 |
| 2007/0177803 | A1* | 8/2007 | Elias | ................... G06F 3/04883 |
| | | | | 382/188 |

(Continued)

FOREIGN PATENT DOCUMENTS

| | | |
|---|---|---|
| DE | 10 2013 011414 A1 | 2/2014 |
| KR | 2009 0096791 A | 9/2009 |

(Continued)

OTHER PUBLICATIONS

"2012 Prius v How-To: Adjusting Outside Mirrors | Toyota" Downloaded from https://www.youtube.com/watch?v=V_NISdhuQxk on Oct. 29, 2018 by Toyota USA, Published on Jan. 12, 2012 (Year: 2012).*

*Primary Examiner* — Mandrita Brahmachari
(74) *Attorney, Agent, or Firm* — Gordon & Rees LLP

(57) ABSTRACT

There is provided a vehicle comprising a first adjustable component, a touch sensitive display, a non-transitory memory storing an executable code, and a hardware processor executing the executable code to display, on the touch sensitive display, a user interface including a control element for controlling the first adjustable component using the touch sensitive display, receive a first selection input from a user using the user interface to select the first adjustable component, receive a first control input including a first initial touch input and a first subsequent drag input from a user using the control element of the user interface to control the first adjustable component, and continuously change an angle of the first adjustable component based on the first control input.

18 Claims, 4 Drawing Sheets

(52) U.S. Cl.
CPC ........ G06F 3/0486 (2013.01); G06F 3/04842 (2013.01); G06F 3/04847 (2013.01); *B60K 2370/113* (2019.05); *B60K 2370/117* (2019.05); *B60K 2370/1438* (2019.05); *B60K 2370/55* (2019.05); *B60K 2370/67* (2019.05); *B60Q 3/82* (2017.02)

(58) Field of Classification Search
CPC ...... B60K 2350/1032; B60K 2370/113; B60K 35/00; B60K 37/04; B60K 2370/117; B60K 2370/67; B60K 2370/55; B60K 2370/1438; B60R 1/02; B60R 1/006; B60Q 3/82
See application file for complete search history.

(56) References Cited

U.S. PATENT DOCUMENTS

| | | | |
|---|---|---|---|
| 2008/0302014 A1* | 12/2008 | Szczerba | B60K 35/00 49/31 |
| 2010/0318266 A1* | 12/2010 | Schaaf | B60K 35/00 701/49 |
| 2011/0085016 A1 | 4/2011 | Kristiansen | |
| 2012/0286661 A1* | 11/2012 | Salter | B60Q 3/74 315/77 |
| 2013/0128047 A1 | 5/2013 | Lee | |
| 2013/0217497 A1* | 8/2013 | Lim | G06F 3/03547 463/37 |
| 2013/0257859 A1* | 10/2013 | Sato | G06T 15/005 345/419 |
| 2014/0267066 A1* | 9/2014 | Kolehmainen | G08C 17/02 345/173 |
| 2014/0347303 A1* | 11/2014 | El Khoury | G02B 26/10 345/173 |
| 2015/0105976 A1* | 4/2015 | Shikii | G06F 3/0488 701/36 |
| 2016/0054914 A1* | 2/2016 | Di Censo | G06F 3/04883 345/173 |
| 2016/0266778 A1* | 9/2016 | Rawlinson | B60K 35/00 |

FOREIGN PATENT DOCUMENTS

| | | |
|---|---|---|
| KR | 2013 0031653 A | 3/2013 |
| WO | WO 2007/121977 A2 | 11/2007 |

* cited by examiner

VIRTUAL JOY STICK CONTROLS FOR ADJUSTABLE COMPONENTS IN VEHICLES

RELATED APPLICATION(S)

The present application claims the benefit of and priority to a U.S. Provisional Patent Application Ser. No. 62/174,457, filed Jun. 11, 2015, which is hereby incorporated by reference in its entirety into the present application.

BACKGROUND

Conventionally, various components of a vehicle are controlled using knobs and buttons. For example, a button is typically provided for selecting a right side mirror and a button is provided for selecting a left side mirror. Once one of the mirrors is selected, the driver then needs to use another one of four buttons, namely, up, down, left and right to adjust the selected mirror, and then repeat the same process with the other mirror. Adjusting other components within the vehicle, such as seats and headlights, is also as cumbersome, since a button or a lever is provided for different elements of a seat, for example, and the driver (or a passenger) needs to use several buttons or levers to adjust the seat. In addition to being cumbersome, some space for and mechanical equipment, such as buttons, must be provided and placed in the vehicle. Even more, these buttons are placed at different locations in different cars, and also function differently in different cars as well, and can be easily broken.

SUMMARY

The present disclosure is directed to systems and methods for virtual joystick controls for adjustable components in vehicles, substantially as shown in and/or described in connection with at least one of the figures, as set forth more completely in the claims.

DETAILED DESCRIPTION

Figure 1:
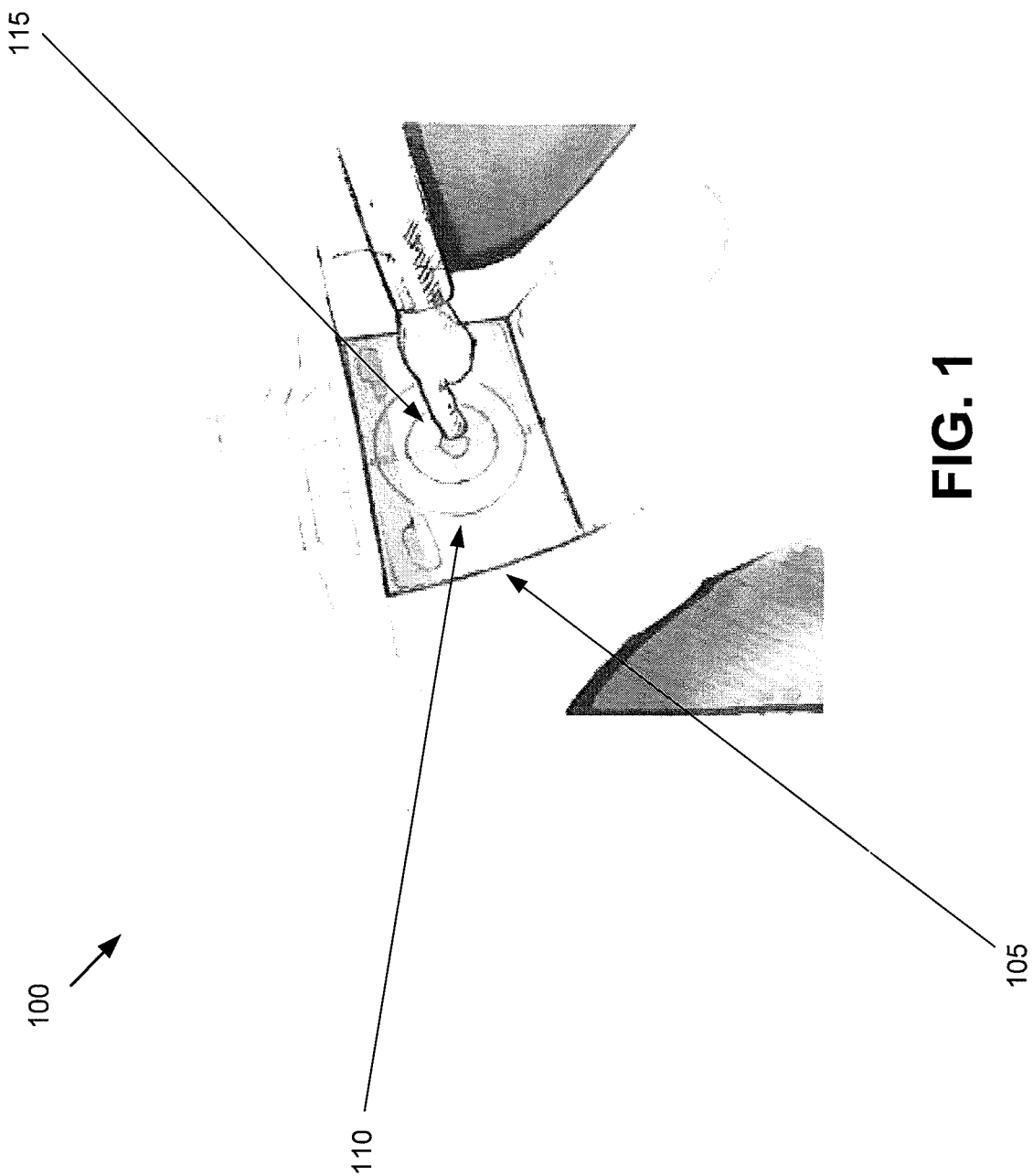
FIG. 1 shows a diagram of an exemplary virtual joystick controls for adjustable components in vehicles, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows exemplary user control display 100 for use in a vehicle (not shown), according to one implementation of the present disclosure. FIG. 1 shows a diagram of an exemplary virtual joystick controls for adjustable components in vehicles, according to one implementation of the present disclosure. As shown in FIG. 1, user control display 100 includes touch sensitive display 105 and control element 110, which can be controlled by one or more fingers 115 of the driver or a user touching touch sensitive display 105. In one implementation, control element 110 may appear in a bullseye shape. Touch sensitive display 105 may be a capacitive touch sensitive display, a resistive touch sensitive display or any other touch sensitive display. In one implementation, user control display 100 is capable of displaying a text, an image, an animated image or a video in one or more colors, including a menu with menu options for selection by a user.

Figure 2:
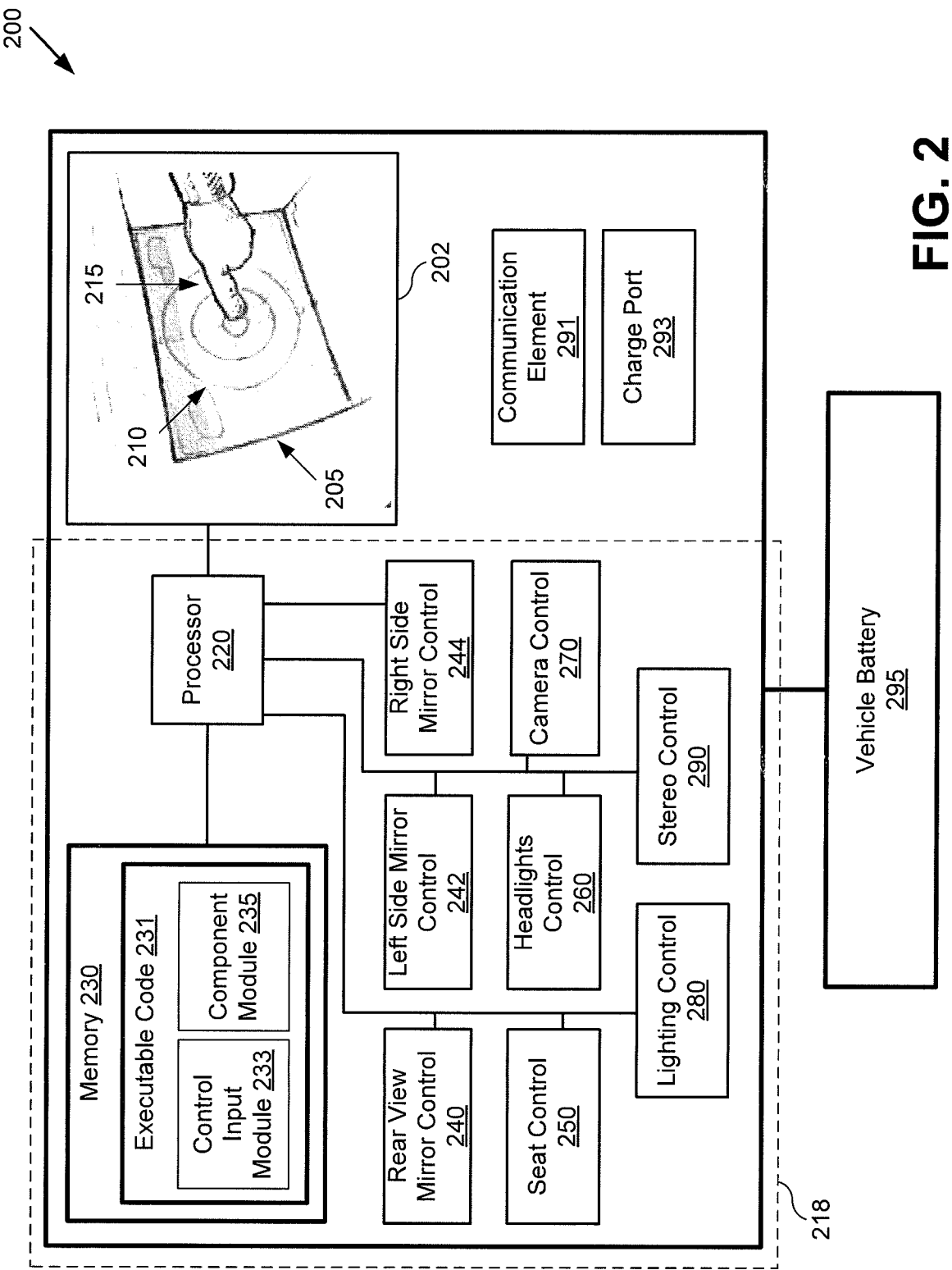
FIG. 2 shows a diagram of an exemplary virtual joystick controls system for adjustable components in vehicles, according to one implementation of the present disclosure.

FIG. 2 shows a diagram of an exemplary virtual joystick controls system for adjustable components in vehicles, according to one implementation of the present disclosure. FIG. 2 shows exemplary user control system 200 for use in the vehicle, according to one implementation of the present disclosure. As shown in FIG. 2, user control system 200 includes user control display 202 and controller 218. User control display 202 includes touch sensitive display 205 and control element 210, which can be controlled by one or more fingers 215 of the driver or a user touching touch sensitive display 205. Touch sensitive display 205 may be a capacitive touch sensitive display, a resistive touch sensitive display or any other touch sensitive display.

As further shown in FIG. 2, controller 218 includes processor 220, memory 230, and at least hardware and/or software for one or more of rear view mirror control 240, left view mirror control 242, right view mirror control 244, seat control 250, headlights control 260, camera control 270, lighting control 280 and stereo control 290. As shown in FIG. 2, in one implementation, power for user control system 200 may be provided by vehicle battery 295.

Processor 220 may be any hardware processor or central processing unit that is capable of executing a software code or algorithm, and control one or more components of user control system 200. In one implementation, processor 220 may be a central processor of the vehicle, and not a distinct and separate processor. Memory 230 is a non-transitory storage device capable of storing the software code or algorithm for execution by processor 220, and may also include text, data, images, animated images, videos, selection menus, etc. In one implementation, the software code or algorithm in memory 230, and also other contents of memory 230, may be wirelessly updated or altered by the vehicle manufacturer or any other authorized person from time to time. The update may be performed automatically or downloaded by the vehicle owner. Memory 230 includes executable code 231. Executable code 231 may include one or more software modules for execution by processor 220. As shown in FIG. 2, executable code 231 includes control input module 233 and component module 235.

Control input module 233 is a software module stored in memory 230 for execution by processor 220 to receive control input from touch sensitive display 205. In some implementations, control input module 233 may receive one or more selection inputs from touch sensitive display 205, each selection input indicating an adjustable component of the vehicle. Control input module 233 may additionally receive one or more control inputs from touch sensitive display 205. For example, control input module 233 may receive a control input signal for repositioning an adjustable component when a user touches touch sensitive display 205. The user may touch control element 210 displayed on touch sensitive display 205, and then drag the touch across touch sensitive display 205. Control input module 233 may receive control input signals from the initial touch and subsequent drag. In some implementations, control input module 233 may transmit the control input signals to component module 235.

Component module 235 is a software module stored in memory 230 for execution by processor 220. In some implementations, component module 235 may receive control input signals from control input module for adjusting and/or repositioning one or more adjustable components, such as an adjustable mirror, an adjustable seat, adjustable headlights, one or more adjustable cameras, one or more adjustable interior lights, stereo settings, etc. Component module 235 may reposition a rear view mirror, left side mirror, and/or right side mirror of the vehicle using rear view mirror control 240, left side mirror control 242, right side mirror control, respectively. In some implementations, each adjustable component control of the vehicle may be an electric motor or other actuator for adjusting the position and/or angle of the adjustable component. In other implementations, an adjustable component control may be an electronic control and/or setting of an adjustable component that may be adjusted, such as the brightness of a light, the color of a light, the volume of the stereo, etc, In one implementation of the present application, the driver may select a mirror adjustment option from a menu displayed on touch sensitive display 205, and then place one finger on control element 210. When processor 220 detects one touch point on control element 210, in one implementation, processor 220 determines that the left side mirror is selected by the driver, and activates left side mirror control 242. In response to determining the direction of movement of the one finger on control element 210, left side mirror control 242 adjusts the left side mirror. For example, when the driver slides his/her finger in the southeast direction on control element 210, left side mirror control 242, under control of processor 220, may tilt the left side mirror down and in. In another example, when the driver slides his/her finger in the northwest direction on control element 210, left side mirror control 242, under control of processor 220, may tilt the left side mirror up and out. Similarly, when the driver slides his/her finger in the north direction on control element 210, left side mirror control 242, under control of processor 220, may tilt the left side mirror up, and so on. In one implementation, the finger may be dragged from the center of a bullseye in any of 0-360 degrees direction, and the degree of up, down, left and right for the left side mirror is adjusted correspondingly.

Figure 3:
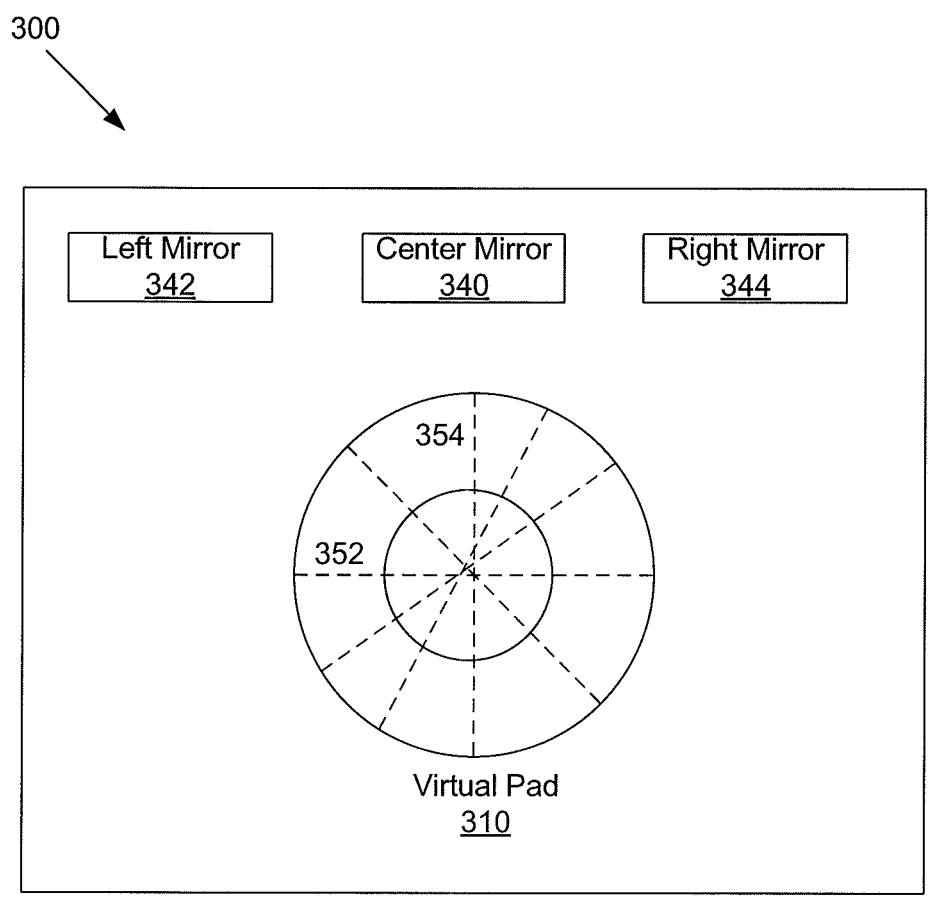
FIG. 3 shows a diagram of an exemplary user interface, according to one implementation of the present disclosure.

For example, the driver may drag his/her finger along any of the dotted lines of control element 350 virtual pad 310 in FIG. 3 or any other dotted lines in between (not shown). Based on the inward or outward movement from the center and the degree from horizontal line 352 or vertical line 354, left side mirror control 242, under control of processor 220, may determine the degree of tilt of the left side mirror in (down), (up), (left), (right), (down-left), (down-right), (up-left) and (up-right) directions. For example, moving the finger upwardly along line 354 would move the left side mirror upwardly, moving the finger downwardly along line 354 would move the left side mirror downwardly, moving the finger to the right along line 352 would move the left side mirror inwardly, moving the finger left along line 352 would move the left side mirror outwardly.

In one implementation, when processor 220 detects two touch points on control element 210, processor 220 may determine that the right side mirror is selected by the driver by placing two fingers on control element 210, and processor 220 activates right side mirror control 244. In response to determining the direction of movement of the two fingers touching control element 210, right side mirror control 244, under the control of processor 220, adjusts the right side mirror. The operation of right side mirror control 244 is similar to the operation of left side mirror control 242, as explained above, except that rather than one finger touching control element 210, two fingers touch control element 210 for activation of right side mirror control 244.

In another implementation, rather than using two fingers to distinguish between the selection of left side and right side mirrors, touch sensitive display 205 may include a touch selection. For example, FIG. 3 shows that left side mirror control 242 may be activated in response to touching left mirror 342 by the driver, and right side mirror control 244 may be activated in response to touching right mirror 344 by the driver, and rear view mirror control 240 may be activated in response to touching center mirror 340 by the driver. Once the selection is made, the operation of rear view mirror control 240 and right side mirror control 244 are similar to the operation of left side mirror control 242, as explained above.

Turning back to FIG. 2, FIG. 2 further illustrates other components of the vehicle, which may be controlled by using control element 210 similar to controlling the left side mirror, as explained above. For example, a seat of the vehicle, such as the driver seat, may be selected using a menu option of touch sensitive display 205. Once the driver seat is selected, a picture of the driver seat may be displayed on user control display 202. Next, the driver may use a finger to point to a moveable part of the seat and drag the moveable part on control element 210 to a desired position. For example, the driver may touch the bottom portion of the seat and drag it forward and backward, and in response, seat control 250 moves the driver seat forward and backward correspondingly. In another example, the driver may touch the back portion of the seat and tilt it forward and backward, and in response, seat control 250 tilts the back portion according to the tilt angle determined from the finger movement. As another example, the driver may touch the headrest portion of the seat and drag it up and down, and in response, seat control 250 moves the headrest of driver seat up and down corresponding to the amount of movement using the finger on control element 210.

In one implementation, front headlights of the vehicle may be selected using a menu option of touch sensitive display 205. Once the front headlights are selected, a picture of a headlight may be displayed on user control display 202. Next, the driver may use a finger to touch the displayed image of the headlight and adjust the headlight on control element 210 similar to adjusting the left side mirror, as explained above. For example, moving the finger upwardly along line 354 would move the front headlights upwardly, moving the finger downwardly along line 354 would move the front headlights downwardly, moving the finger to the right along line 352 would move the front headlights inwardly, moving the finger left along line 352 would move the front headlights outwardly. Also, for example, when the driver slides his/her finger in the southeast direction on control element 210, headlights control 260, under control of processor 220, may tilt the front headlights down and in. In another example, when the driver slides his/her finger in the northwest direction on control element 210, headlights control 260, under control of processor 220, may tilt the front headlights up and out. As explained above, the finger may move in any of 0-360 degrees, and the tilt is adjusted according to the degree of movement on control element 210.

In one implementation, a rear or a front camera of the vehicle may be selected using a menu option of touch sensitive display 205. Once the camera is selected, a picture of a camera or a current view or video input of the camera may be displayed on user control display 202. Next, the driver may use a finger to touch the displayed image or video and adjust the camera on control element 210 similar to adjusting the left side mirror, as explained above. If current view or video input of the camera is being displayed, the user would see the camera view changing by moving the finger on control element 210. For example, moving the finger upwardly along line 354 would move the camera upwardly, moving the finger downwardly along line 354 would move the camera downwardly, moving the finger to the right along line 352 would move the camera inwardly, moving the finger left along line 352 would move the camera outwardly. Also, for example, when the driver slides his/her finger in the southeast direction on control element 210, camera control 270, under control of processor 220, may tilt the camera down and in. In another example, when the driver slides his/her finger in the northwest direction on control element 210, camera control 270, under control of processor 220, may tilt the camera up and out. As explained above, the finger may move in any of 0-360 degrees, and the tilt is adjusted according to the degree of movement on control element 210. In one implementation, the user may use one finger touching control element 210 to indicate a selection of the front camera, and two fingers touching control element 210 to indicate a selection of the rear camera, similar to the scheme explained in conjunction with selecting and controlling the left side and right side mirrors.

In one implementation, an interior lighting of the vehicle may be selected using a menu option of touch sensitive display 205. Once the interior lighting is selected, processor 220 activates lighting control 280, and the driver may use a finger to touch control element 210 and move the finger up or down on control element 210 to change the intensity and color of the interior lighting of the vehicle. For example, using one finger to touch control element 210 may indicate changing the light intensity, and using two fingers to touch control element 210 may indicate changing the color, which may change in a progressive spectrum by moving the finger in different directions.

In one implementation, a stereo of the vehicle may be selected using a menu option of touch sensitive display 205. Once the stereo is selected, processor 220 activates stereo control 290, and the driver may use a finger to touch control element 210 and move the finger up or down on control element 210 to change volume, balance, fade, tone and base of stereo speakers. For example, using one finger to touch control element 210 may indicate changing the volume, and an up direction may indicate a higher volume and a down direction a lower volume, and using two fingers to touch control element 210 may indicate changing the balance of stereo speakers.

Turning back to FIG. 2, communication element 291 may be a communication port for connecting computing device 110 to one or more other devices, such as user device 160. In some implementations, communication element 291 may be configured to receive a communication cable, such as a universal serial bus (USB) cable, Firewire cable, Ethernet cable, telephone cable, HDMI cable, video game control cable, etc. In other implementations, communication element 291 may enable wireless communications, such that controller 218 may be wirelessly connected to various computing devices, such as user device 160, using WiFi, cellular, Bluetooth®, Bluetooth® Low Energy (BLE), etc. Communications element 291 may be integrated with charge port 293. Charge port 293 may be a port for receiving a charging cable to charge battery 295. In some implementations, charge port 293 may enable wired connection for communication with the Internet. For example, when a charging cable is engaged to charge port 293, the charging cable may connect processor 220 with the Internet. In some implementations, processor 220 may download updates and/or upload data or communication via charge port 293.

Figure 4:
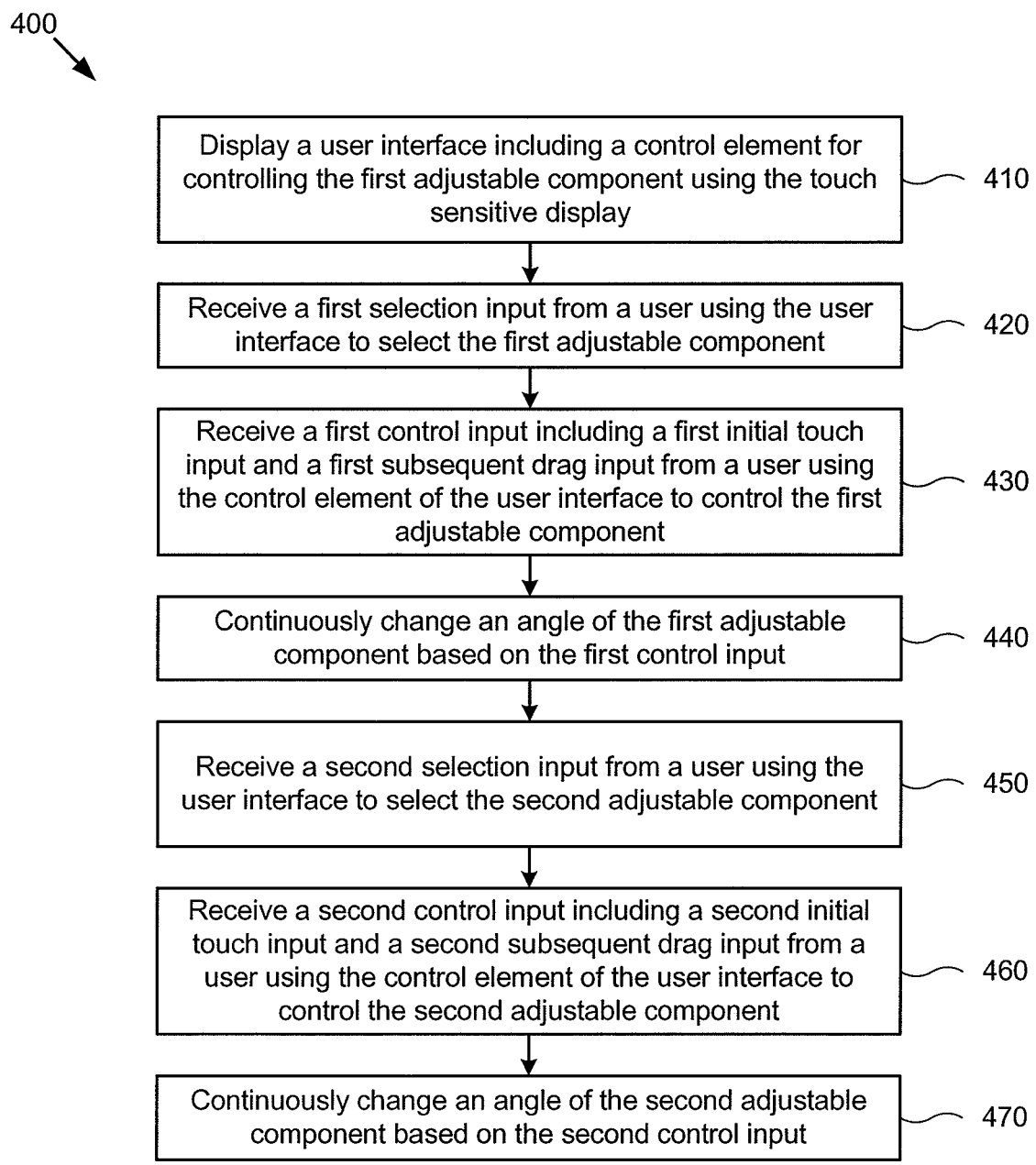
FIG. 4 shows a flowchart illustrating an exemplary method of adjusting adjustable components in vehicles using virtual joysticks, according to one implementation of the present disclosure.

FIG. 4 shows a flowchart illustrating an exemplary method of adjusting adjustable components in vehicles using virtual joysticks, according to one implementation of the present disclosure. Method 400 begins at 410, where executable code 240 displays a user interface including control element 210 for controlling the first adjustable component using touch sensitive display 205. In some implementations, the user interface may include one or more touch elements for selecting an adjustable component to adjust using control element 210. For example, the user interface may include touch elements, such as left mirror 342, center mirror 340, right mirror 344, etc., for selecting a mirror to adjust. In other implementations, the one or more touch elements may allow a user to select a function of stereo control 290 to adjust, such as the volume, balance, fader, equalizer settings, etc. In another implementation, the user interface may include touch elements for selecting a seat to reposition, an interior light to change the brightness and/or color, a front or rear camera to reposition, etc.

At 420, executable code 240 receives a first selection input from a user using the user interface to select the first adjustable component. In some implementations, the first selection input may include the user touching one of the touch elements to select an adjustable component to adjust. In other implementations, the first selection input may be a defined touch, such as a one-finger touch, on touch sensitive display 205. Control input module 233 may include a plurality of defined touch patterns corresponding to a plurality of adjustable components of the vehicle.

At 430, executable code 240 receives a first control input including a first initial touch input and a first subsequent drag input from a user using control element 210 of the user interface to control the first adjustable component. For example, when the driver of the vehicle selects the right side mirror mounted to the outside of the passenger door of the vehicle, the driver may adjust the angle of the right side mirror by touching control element 210 in a first position and dragging the touch across touch sensitive display 205. Control input module 233 may receive the first control input and may transmit the input to component module 235.

At 440, executable code 240 continuously changes an angle of the first adjustable component based on the first control input. For example, when the driver selects the right side mirror, touches control element 210 in the center and drags the touch in a line that is forty-five degrees towards the upper right side of touch sensitive display 205, i.e., in a north-east direction, right side mirror control may change the angle of the right side mirror by angling the mirror away from the body of the car and upwards. Right side mirror control 244 may change the angle of the right side mirror in a continuous manner, such that when the user slowly drags the touch across touch sensitive display 205, right side mirror control 244 correspondingly adjusts the angle of the right side mirror slowly. Similarly, if the driver drags the touch quickly across touch sensitive display 205, right side mirror control 244 may adjust the angle of the right side mirror quickly. In some implementations, the angle of the mirror is changed to adjust the view shown in the mirror from the user's point of view. If the user is the driver of the vehicle, the angle of the mirror will be adjusted such that, from the driver's point of view, the scene visible in the mirror changes based on the user input on the touch screen.

At 450, executable code 240 receives a second selection input from a user using the user interface to select the second adjustable component. For example, after the driver adjusts the angle of the right side mirror, the driver may want to adjust a second adjustable component of the vehicle, such as the center mirror inside the passenger cabin of the vehicle. To select the second adjustable component, the driver may select a touch sensitive element on the user interface, such center mirror 340. In other implementations, touch sensitive display 205 may include multi-touch capability, and the driver may select the rear view mirror by touching control element 210 using a multi-finger touch, such as a two-finger touch.

At 460, executable code 240 receives a second control input including a second initial touch input and a second subsequent drag input from a user using the control element of the user interface to control the second adjustable component. In some implementations, the user may touch control element 210 and drag the touch to control the second adjustable element. The second initial touch may include a one-finger touch or a multi-finger touch, such as a two-finger touch dragged across touch sensitive display 205. When the touch is a multi-finger touch, control input module 233 may take an average of the position of the plurality of fingers touching the screen to transmit to component module 235 as the second control input.

At 470, executable code 240 continuously changes an angle of the second adjustable component based on the second control input. In some implementations, adjusting the second adjustable component may include changing an angle of the second adjustable component, such as changing the angle of the rear-view mirror in the vehicle, or changing the angle of a camera, a headlight, a seat component, etc. In other implementations, adjusting the second adjustable element may include adjusting a position of an adjustable element, such as sliding the driver seat to a different position in the vehicle, sliding a passenger seat to a different position. In another implementation, adjusting the second adjustable element may include changing the brightness of one or more lights in the vehicle, changing a color of one or more interior lights of the vehicle, adjusting a stereo setting in the vehicle, etc.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A vehicle comprising:
  a first adjustable component;
  a touch sensitive display configured to display a control element;
  second adjustable component;
  a non-transitory memory storing an executable code; and
  a hardware processor executing the executable code to:
    display, on the touch sensitive display, a user interface including a control element for controlling the first adjustable component using the touch sensitive display;
    receive a first selection input from a user using the user interface to select the first adjustable component;
    receive a second selection input from a user using the user interface to select the second adjustable component;
    receive a first control input including a first initial touch input to the control element and a first subsequent drag input from a user across the control element of the user interface to control degree of tilt for the first adjustable component, wherein the first adjustable component is identified based on one finger touching the control element;
    continuously change an angle of the first adjustable component based on the first control input to the control element and direction of the first subsequent drag input relative to a center of the control element;
    receive a second control input including a second initial touch input and a second subsequent drag input from a user using the control element of the user interface to control the second adjustable component, wherein the second adjustable component is identified based on a plurality of fingers touching the control element;
    continuously adjust the second adjustable component based on the second control input and direction of the second subsequent drag input relative to the center of the control element;
    wherein the first initial touch input and the first subsequent drag input is only of a single finger, and wherein the second initial touch input and the second subsequent drag input is of a plurality of fingers.

2. The vehicle of claim 1, wherein the first adjustable component is a first rear-view mirror and the second adjustable component is a second rear-view mirror.

3. The vehicle of claim 2, wherein at least one of the first rear-view mirror and the second rear-view mirror is a side mirror of the vehicle.

4. The vehicle of claim 1, wherein the user interface includes a component selection for entering the first selection input and the second selection input.

5. The vehicle of claim 1, wherein the touch sensitive display includes a multi-touch capability, and wherein the first selection input is indicated by a first touch input and the second selection input is indicated by second touch input.

6. The vehicle of claim 1, wherein the first adjustable component is one of a mirror, a camera, and a headlight.

7. The vehicle of claim 1, wherein the second adjustable component is one of an interior light and a stereo.

8. The vehicle of claim 7, wherein adjusting the second adjustable component includes adjusting a setting of the stereo.

9. The vehicle of claim 7, wherein adjusting the second adjustable component includes adjusting one of a brightness and a color of the interior light.

10. A method for use with a vehicle having a first adjustable component, a second adjustable component, a touch sensitive display and a hardware processor, the method comprising:

displaying, on the touch sensitive display, a user interface including a control element for controlling the first adjustable component using the touch sensitive display;

receiving, using the hardware processor, a first selection input from a user using the user interface to select the first adjustable component, and a second selection input from a user using the user interface to select the second adjustable component;

receiving, using the hardware processor, a first control input including a first initial touch input to the control element and a first subsequent drag input from a user across the control element of the user interface to control degree of tilt for the first adjustable component, wherein the first adjustable component is identified based on one finger touching the control element, and a second control input including a second initial touch input and a second subsequent drag input from a user using the control element of the user interface to control the second adjustable component, wherein the second adjustable component is identified based on a plurality of fingers touching the control element;

continuously changing, using the hardware processor, an angle of the first adjustable component based on the first control input to the control element and direction of the first subsequent drag input relative to a center of the control element, and an angle of the second adjustable component based on the second control input to the control element and direction of the second subsequent drag input relative to the center of the control element;

wherein the first initial touch input and the first subsequent drag input is only of a single finger, and wherein the second initial touch input and the second subsequent drag input is of a plurality of fingers.

11. The method of claim 10, wherein the first adjustable component is a first rear-view mirror and the second adjustable component is a second rear-view mirror.

12. The method of claim 11, wherein at least one of the first rear-view mirror and the second rear-view mirror is a side mirror of the vehicle.

13. The method of claim 10, wherein the user interface includes a component selection for entering the first selection input.

14. The method of claim 10, wherein the touch sensitive display includes a multi-touch capability, and wherein the first selection input is indicated by a first touch input and the second selection input is indicated by second touch input.

15. The method of claim 10, wherein the first adjustable component is one of a mirror, a camera, and a headlight.

16. The method of claim 10, wherein the second adjustable component is one of an interior light and a stereo.

17. The method of claim 16, wherein adjusting the second adjustable component includes adjusting a setting of the stereo.

18. The method of claim 16, wherein adjusting the second adjustable component includes adjusting one of a brightness and a color of the interior light.

* * * * *